United States Patent
Beckett

(10) Patent No.: US 11,117,492 B2
(45) Date of Patent: Sep. 14, 2021

(54) FOAM PART OF A MOTOR VEHICLE SEAT HAVING SEAT OCCUPANCY DETECTION, AND METHOD FOR THE PRODUCTION THEREOF

(71) Applicant: AUDI AG, Ingolstadt (DE)

(72) Inventor: Jürgen Beckett, Mömbris (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/961,369

(22) PCT Filed: Jan. 24, 2019

(86) PCT No.: PCT/EP2019/051685
§ 371 (c)(1),
(2) Date: Jul. 10, 2020

(87) PCT Pub. No.: WO2019/149602
PCT Pub. Date: Aug. 8, 2019

(65) Prior Publication Data
US 2020/0346560 A1  Nov. 5, 2020

(30) Foreign Application Priority Data
Jan. 30, 2018  (DE) ..................... 10 2018 201 409.4

(51) Int. Cl.
*B60N 2/00* (2006.01)
*B60N 2/70* (2006.01)

(52) U.S. Cl.
CPC ........... *B60N 2/002* (2013.01); *B60N 2/7017* (2013.01); *B60N 2/7094* (2013.01)

(58) Field of Classification Search
CPC .... B60N 2/002; B60N 2/7017; B60N 2/7094; A47C 31/12; A47C 31/126
(Continued)

(56) References Cited

U.S. PATENT DOCUMENTS 6,039,344 A * 3/2000 Mehney ................. B60N 2/002
177/144
2010/0170722 A1 * 7/2010 Maeda ................. B60N 2/7094
177/136

(Continued)

FOREIGN PATENT DOCUMENTS

DE  20 2017 005 093 U1  12/2017
EP  1 634 516 A1  3/2006
EP  1 712 403 A1  10/2006

OTHER PUBLICATIONS

International Search Report dated May 14, 2019 in corresponding International Application No. PCT/EP2019/051685; 7 pages.
(Continued)

*Primary Examiner* — Mark R Wendell
(74) *Attorney, Agent, or Firm* — Maier & Maier, PLLC

(57) ABSTRACT

A foam part of a motor vehicle seat having seat occupancy detection, wherein the foam part includes a seat surface and an underside opposite to the seat surface, and wherein a number of seat occupancy detection sensors are arranged in the region of the underside and these sensors are fastened via a number of holding profiles on the foam part to detect a weight force acting on the seat surface. Furthermore, the invention comprises a method for producing such a foam part and a motor vehicle seat having foam part.

7 Claims, 1 Drawing Sheet

(58) Field of Classification Search
USPC .................................................. 297/217.2
See application file for complete search history.

(56) References Cited

U.S. PATENT DOCUMENTS

| | | | | |
|---|---|---|---|---|
| 2015/0003493 A1* | 1/2015 | Bieck | ................... | B60N 2/5685 |
| | | | | 374/51 |
| 2015/0137568 A1* | 5/2015 | Boyer | ..................... | B60N 2/54 |
| | | | | 297/217.1 |
| 2015/0137569 A1* | 5/2015 | Goedert | ................... | G01L 1/22 |
| | | | | 297/217.1 |
| 2015/0143927 A1* | 5/2015 | Goedert | ............... | B60N 2/7094 |
| | | | | 73/862.641 |
| 2015/0239367 A1* | 8/2015 | Sickon | ............... | G01G 19/4142 |
| | | | | 340/457.1 |
| 2017/0313228 A1* | 11/2017 | Liu | ..................... | B60N 2/5825 |

OTHER PUBLICATIONS

Written Opinion dated May 14, 2019 in corresponding International Application No. PCT/EP2019/051685; 14 pages including Machine-generated English-language translation.
English-language translation of International Preliminary Report on Patentability dated Aug. 4, 2020, in corresponding International Application No. PCT/EP2019/051685; 5 pages.

\* cited by examiner

FOAM PART OF A MOTOR VEHICLE SEAT HAVING SEAT OCCUPANCY DETECTION, AND METHOD FOR THE PRODUCTION THEREOF

FIELD

The disclosure relates to a foam part of a motor vehicle seat having seat occupancy detection and a method for the production thereof.

BACKGROUND

A variety of sensors have been installed over time in the vehicle interior of a motor vehicle in the course of occupant protection. One goal here is to minimize the risk of injury to the vehicle occupants. Seat occupancy detection sensors, for example, pressure sensors, have been used in the front passenger seat and in the meantime also in the seats of the second and further rows of seats, from the signal of which inferences can be drawn about the occupancy of the seat. In response to a pressure acting due to the weight of a vehicle occupant, a pressure-sensitive switch is actuated. As soon it is detected on the basis of the signal of the seat occupancy detection sensor that a person is sitting on the seat who has not fastened the safety belt, a warning message is triggered. An essential point here is that the seat occupancy detection sensor is exactly positioned and aligned in relation to the seat surface, so that a signal is only triggered from a predetermined pressure force.

SUMMARY

It is the object of the invention to refine a foam part of a motor vehicle seat having seat occupancy detection in such a way that a presence of a vehicle occupant on the motor vehicle seat is reliably detected.

Under a further aspect of the present invention, it is an object to refine a method for producing a foam part of a motor vehicle seat having seat occupancy detection in such a way that the foam part is producible inexpensively and easily.

A defined distance of the seat occupancy detection sensor to the foam surface is achieved by the foam part according to the invention. The foam surface is the side of the motor vehicle seat facing toward the seat surface here. The side opposite to the foam surface is referred to hereafter as the underside. A number of seat occupancy detection sensors are arranged in the region of the underside and/or in corresponding recesses of the foam part.

A further advantage of the foam part according to the invention having seat occupancy detection is that component tolerances are compensated for during the assembly of the motor vehicle seat. The motor vehicle seat comprises at least one foam part having a wire frame, a structure frame attached fixed on the vehicle body, and a number of seat occupancy detection sensors (called sensors hereafter).

The method according to the invention is distinguished in that a foam part of a motor vehicle seat having seat occupancy detection is producible by simple method steps. The holding elements for the number of sensors can also be foamed in during the foaming of the foam part. Alternatively, the holding elements can also be adhesively bonded on the foam part.

BRIEF DESCRIPTION OF THE DRAWINGS

The disclosure is described by way of example hereinafter with reference to the appended drawings.

In the figures.

A motor vehicle seat fundamentally comprises as components a structure frame for holding the motor vehicle seat and fastening it on the vehicle body, a foam part or foam cushion for covering the structure frame, and an upholstery fabric for covering the foam part. In a motor vehicle seat having seat occupancy detection, furthermore sensors are arranged in the region of the underside, i.e., the side of the motor vehicle seat facing away from the seat surface, in dependence on the number of seat spaces.

DETAILED DESCRIPTION

Figure 1:
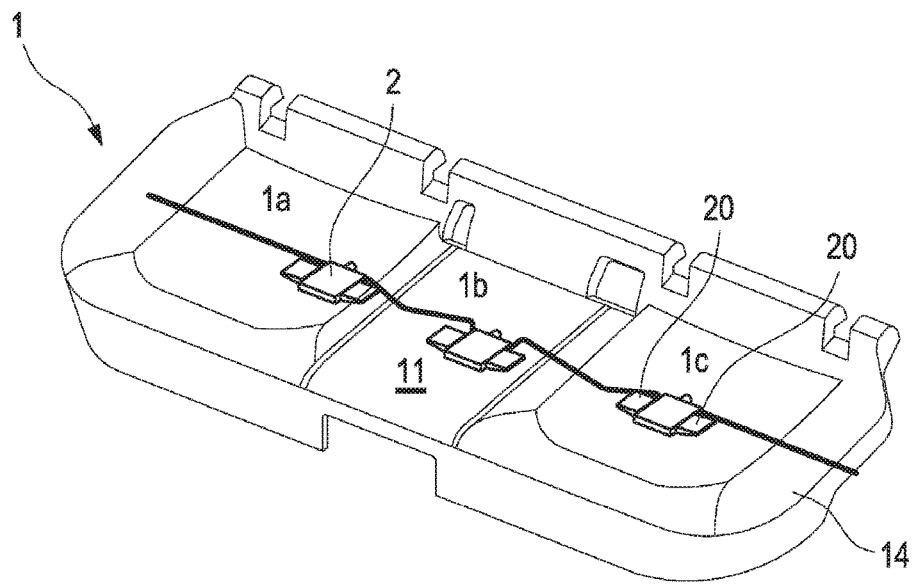
FIG. 1 shows a perspective three-dimensional view of a transparent seat cushion having seat occupancy detection sensors.

A transparent seat cushion 1 of a vehicle rear seat having three seat spaces 1a, 1b, 1c and sensors 2 associated with the seat spaces is illustrated in FIG. 1 in a perspective three-dimensional view. The seat cushion 1 has a seat surface 11 here and an underside 12 opposite to the seat surface 11. The seat cushion 1 typically comprises a foam part or foam cushion 14 covered using an upholstery material, having a wire frame 15. The foam part 14 preferably consists of polyurethane or another flexible foam and can be cast on the wire frame 15 or fastened thereon in another manner. The attachment to the structure frame fixed on the vehicle body, which is not shown in the figure, is performed via the wire frame 15. The wire frame 15 is also not shown completely, but rather only in the region of the sensors 2 as a cross member. The construction of a motor vehicle seat or a seat arrangement for the second row of a motor vehicle is known and will not be explained in greater detail.

Figures 2, 3:
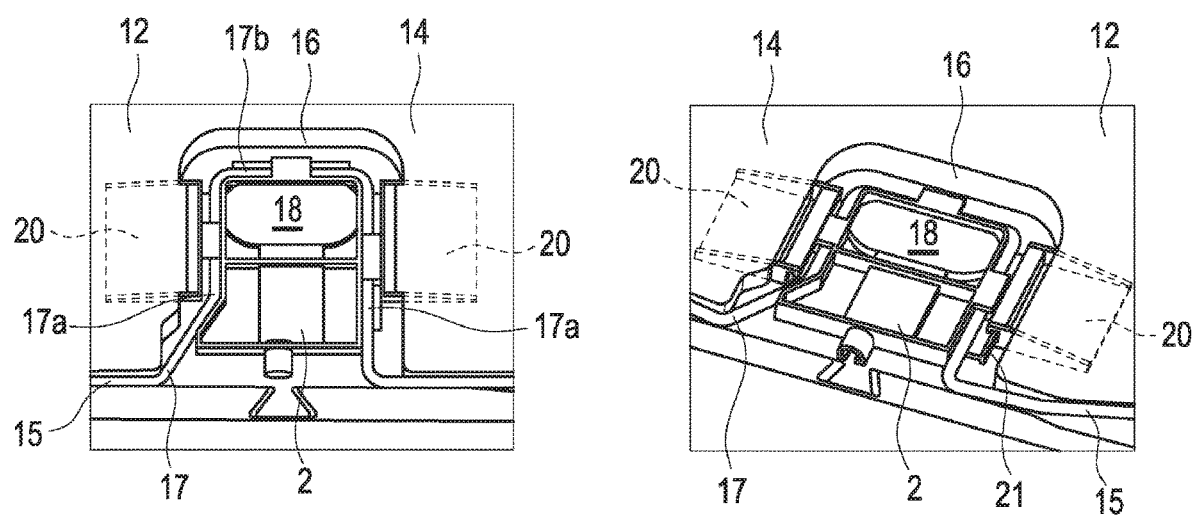
FIG. 2 shows a detail view of the underside of the seat cushion having seat occupancy detection sensor.
FIG. 3 shows a detail view according to FIG. 2 in a perspective illustration.

FIGS. 2 and 3 show one embodiment of the arrangement and fixing of a sensor 2 in the region of a recess 16 on the underside 12 of the foam part 14. It is apparent that a wire section 17 of the wire frame 15 rests on the edge in the recess 16 as a section bent in a U shape. The wire section 17 comprises in this case two lateral sections 17a and a connecting section 17b connecting the lateral sections.

As is apparent from the figures, the sensor is held via holding profiles 20. The holding profiles are foamed into the foam part in this case on opposing sides of the recess 16 and extend essentially in parallel to the seat surface. The holding profiles 20 are preferably made of a plastic material. The sensor preferably comprises a holding plate 18 and is fixed thereon and is accommodated in the recess between the wire section 17. The holding profiles 20 have a peripheral groove, into which the holding plate 18 can be inserted via peripheral guides 21. Of course, other connections can also be provided between holding profiles 20 and holding plate 18.

The sensor 2 is furthermore fixed via the holding plate 18 on the wire section 17, preferably clipped thereon on the lateral sections 17a and the connecting section 17b. A pressure sensor having a pressure switch is used as the sensor.

In an embodiment of the foam part 14 which is not shown, the sensor is only held fixed via the foamed-in holding profiles 20. The number of the holding profiles 20 and the formation thereof can be variable in this case.

The invention claimed is:

1. A foam part of a motor vehicle seat comprising:
seat occupancy detection, wherein the foam part further comprises a wire frame, a seat surface, and an underside opposite to the seat surface, the underside further comprising at least one recess, wherein a U-shaped wire section of the wire frame rests around an edge of the at least one recess, and wherein a number of seat occupancy detection sensors are arranged in the region of the underside and these sensors are fastened via a number of holding profiles on the foam part to detect a weight force acting on the seat surface, the sensors having a holding plate and the holding profiles having peripheral guides for receiving the holding plate, and wherein one or more of the sensors is arranged in the U-shaped wire section of the at least one recess.

2. The foam part as claimed in claim 1, wherein the number of holding profiles are foamed into the foam part.

3. The foam part as claimed in claim 1, wherein the number of seat occupancy detection sensors are fastened on the holding plate.

4. The foam part as claimed in claim 1, wherein the number of seat occupancy detection sensors are held via the holding plate clipped on a wire section of the wire frame.

5. A method for producing a foam part as claimed in claim 1, having the following steps:
   a. providing a foam mold for producing the foam part and a wire frame disposed in the foam mold for supporting the foam part, wherein the foam mold forms at least one recess in an underside of the foam part and wherein a U-shaped wire section of the wire frame rests around an edge of the at least one recess;
   b. providing a number of holding profiles with peripheral guides for receiving a senor holding plate;
   c. inserting the number of holding profiles into the foam mold in the region of the position of the number of seat occupancy detection sensors to be arranged, wherein the position of the number of seat occupancy detection sensors is in the at least one recess;
   d. foaming the foam part in the foam mold covering the wire frame with foam and foaming in of the holding profiles; and
   e. removing the foam part from the foam mold.

6. The method as claimed in claim 5 having the step g) providing a number of seat occupancy detection sensors and fixing the sensors on the holding profiles.

7. The method as claimed in claim 6 having the step h) additionally fixing the sensors on the wire frame.

* * * * *